United States Patent [19]

Wreede et al.

[11] Patent Number: 4,478,490

[45] Date of Patent: Oct. 23, 1984

[54] NOISE REDUCTION IN COHERENT SYSTEMS

[75] Inventors: John E. Wreede, Monrovia; James A. Arns, Culver City, both of Calif.

[73] Assignee: Hughes Aircraft Company, El Segundo, Calif.

[21] Appl. No.: 545,034

[22] Filed: Oct. 25, 1983

Related U.S. Application Data

[63] Continuation of Ser. No. 317,208, Nov. 2, 1981, abandoned.

[51] Int. Cl.$^3$ ............................................. G03H 1/32
[52] U.S. Cl. .............................. 350/162.11; 350/3.81; 350/320; 350/448
[58] Field of Search ................. 350/3.7, 3.6, 3.75–3.79, 350/3.83–3.86, 320, 319, 266, 269, 162.11, 163, 448; 356/347

[56] References Cited

U.S. PATENT DOCUMENTS

| | | | |
|---|---|---|---|
| 3,640,599 | 2/1972 | van Ligten | 350/3.81 |
| 3,666,344 | 5/1972 | Mottier | 356/347 |
| 3,754,814 | 8/1973 | Leith | 350/3.81 |
| 3,819,248 | 6/1974 | Takeda et al. | 350/3.81 |

FOREIGN PATENT DOCUMENTS 24547  2/1977  Japan ................................. 350/3.86

OTHER PUBLICATIONS

Gruber, L. S. et al., "On the Apodization of Coherent Imaging Systems", Optical Engineering Sep./Oct. 1974, vol. 13, No. 5, pp. 451–454.

Matsumura, M. "Speckle Noise Reduction by Random Phase Shifters", Japanese Journal of Applied Physics vol. 13, No. 3, pp. 557–558, Mar. 1974.

Schulman et al., "Noise Diffraction Patterns Eliminated in Coherent Optical Systems", NASA Tech. Brief 71-10236, Goddard Space Flight Center, Jul. 1971.

Primary Examiner—Bruce Y. Arnold
Attorney, Agent, or Firm—Lawrence V. Link, Jr.; Leonard A. Alkov; A. W. Karambelas

[57] ABSTRACT

A method of producing coherent radiation signals which have reduced coherent noise content. The method involves modulation of the position of an apodizer or aperture disposed in the optical path of the radiation provided by the coherent radiation source. The modulation causes diffraction patterns created by the apodizer or aperture to be unstable, hence reducing the noise content of the transmitted radiation. In particular, a method of producing holographic exposures containing reduced coherent noise content is disclosed. The positions of apertures or apodizers utilized in producing the holographic exposure are modulated during the exposure process. The modulation is on the order of wavelengths of the illuminating radiation used to produce the exposure. The position modulation creates a slight fogging of the exposure due to the noise, but the desired hologram is recorded with little or no decrease in efficiency. Also, a method of producing an apodizer for use in generating the holographic exposure is disclosed. During preparation of the apodizer, it is modulated in position with respect to the illuminating radiation. The position is modulated on the order of wavelengths of the illuminating radiation. The modulation procedure reduces the noise content of the apodizer.

5 Claims, 4 Drawing Figures

NOISE REDUCTION IN COHERENT SYSTEMS

This is a continuation of application Ser. No. 317,208, filed Nov. 2, 1981, now abandoned.

BACKGROUND

The present invention relates generally to coherent radiation systems, and more particularly to a method of reducing noise introduced into systems using coherent radiation sources.

Numerous systems employ the use of coherent radiation sources to irradiate film, detectors, recording media, and the like. For example, the generation of holograms involves the recording of a diffraction pattern generated by the interference of two beams of coherent radiation, such as is provided by laser sources, or the like. The holographic exposure may be recorded on photographic plates, in a gelatinous substance, or in other available media as is well-known in the art. In order to record a particular holographic image, the coherent radiation source may be split into two or more beams to form the hologram.

An apodizer may be disposed along the optical path between the light source and the recording medium. An apodizer is an element which changes the distribution of the radiation passing through it. This apodizer may be either an aperture which limits the size or shape of the coherent beam, or may be a material which filters the beam in order to produce a more desirable beam energy profile, or the like. For example, one type of apodizer is disclosed in a publication entitled "Holographic filter that transforms a Gaussian into a uniform beam", by M. Quintanilla et al, Applied Optics, Vol. 20, NO. 5, Mar. 1, 1981. Another apodization process is disclosed in "Method for converting a Gaussian laser beam into a uniform beam," by W. Lee, Optics Communications, Vol. 6, No. 6, Mar. 15, 1981.

A major problem in producing holograms is that the optical components, including the apodizer, produce unwanted diffraction patterns which are recorded during the holographic exposure. For example, an aperture stop, such as a circular aperture, diffracts the light transmitted therethrough at the edge of the aperture. This diffraction of the light creates noise which is recorded during the holographic exposure. When the hologram is reconstructed, the unwanted diffraction noise is also reconstructed as an image of the aperture and reduces the quality of the desired image.

A variety of prior systems have been contemplated or used in order to reduce diffraction noise from coherent optical systems. For example, a photographic negative masking system is a standard commercial procedure for use with incoherent light, but introduces considerable diffraction noise with coherent optical systems. Grainless masking systems, such as photochromics, tend to be unstable and have phase variations which create noise in coherent optical systems. Filters may be ground out of colored glass which give even illumination in coherent light without diffraction noise. However, such filters affect the phase of the light wavefronts, and are therefore unacceptable for use in holography. Prior art coherent optical systems utilizing apertures have attempted to focus the defining aperture onto the holographic plane to eliminate the diffraction pattern. Unfortunately, optical constraints on many systems restrict the use of this method.

One particular method for use in imaging systems is disclosed in a NASA publication entitled "Elimination of Coherent Noise in a Coherent Light Imaging System", by Grebowsky et al. The publication is identified in a NASA Technical Brief and Technical Support Package number 71-10236, dated July 1971. Noise diffraction patterns created by dust, blemishes or scratches are blurred by spinning the lenses in the system about their optical axes. The diffraction patterns created by the dust, blemishes or scratches are blurred by the spinning lenses. The rotating lenses eliminate Newton's rings created in the image due to the dust and scratches.

Accordingly, it would be an improvement in the coherent optical systems art to provide for a method which reduces coherent noise recorded during an operation of such systems. In particular, it would be an improvement in the holographic art to provide a method which reduces unwanted diffraction noise during construction and reconstruction of optical holograms.

SUMMARY OF THE INVENTION

In order to overcome the problems existing in the prior art, the present invention provides for a method of producing coherent radiation signals which have reduced coherent noise content. The method comprises the steps of disposing an apodizer along an optical path associated with a coherent radiation system. The position of the apodizer is then modulated with respect to a radiation source of the system during operation of the system.

The modulation is on the order of wavelengths of the illuminating radiation. The modulation may be in a direction relative to the illuminating radiation which is axial, transverse, radial, or a combination thereof. For example, a non-circular aprodizer may be rotated, while a circular apodizer, such as an iris diaphragm, may be expanded and contracted.

In one specific embodiment, the method comprises producing an intensity mask, such as an aperture or apodizer which is placed in the optical path of a coherent radiation source used to generate a holographic exposure. During the exposure process, the position of the intensity mask is modulated with respect to the radiation source. The position of the mask is moved during the holographic exposure on the order of wavelengths of the illuminating radiation. This motion causes insufficient fringe stability to exist in the diffraction patterns produced by the mask.

Hence, a hologram of the noise is not recorded. Although the noise content is affected, there is and insufficient change in the phase of the desired wavefronts of the coherent radiation to affect the desired hologram. The diffraction patterns created by the noise vary continuously in position and in the case of an amplitude hologram create an overall fogging of the recording medium. However, the diffraction patterns due to the noise are not reconstructed, an occurrence which is typical in a conventional hologram.

An additional improvement in reducing coherent noise in holograms may be provided by undertaking a further step in the method of the present invention. This step includes modulating the position of the light intensity mask during the formation thereof. Thus, in preparing a photographic mask, for example, such as photographic film which may be used as an apodizer, motion of the mask during formation eliminates the noise in the exposure originating from coherent radiation speckle.

BRIEF DESCRIPTION OF THE DRAWING

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
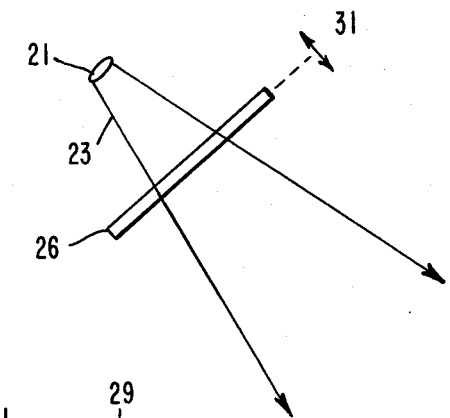
FIG. 1 illustrates one method of producing low noise coherent optical signals in accordance with the principles of the present invention.

Referring to FIG. 1, a system employing the principles of the present invention is shown. The system comprises a coherent radiation source 21 which projects a coherent radiation beam 23 through an apodizer 26. The coherent radiation source 21 may be any conventional coherent source, such as a laser, a piezoelectric crystal, or a speaker for use in acoustic holography, or the like. The apodizer 26 is used to change the distribution of the energy of the radiation passing therethrough.

One method in accordance with the principles of the present invention involves modulating the position of the apodizer 26 during operation of the system, as indicated by the arrow 31. Coherent noise created by the apodizer 26 during operation is reduced by modulating the position of the apodizer 26.

FIG. 1 may also be used to illustrate a specific application of the method of the present invention. The system of FIG. 1 may be employed to generate an intensity mask (apodizer) for use in generating holographic exposures. Hereinafter, the apodizer 26 will be referred to as intensity mask 26.

The coherent radiation source 21, typically a laser in optical holographic applications, projects a coherent beam 23 through the intensity mask 26. During the exposure process, the position of the mask 26 is modulated as shown by arrow 31. Coherent noise speckle normally introduced into the diffraction pattern created by the mask 26 is reduced by the position modulation during exposure.

Figure 2:
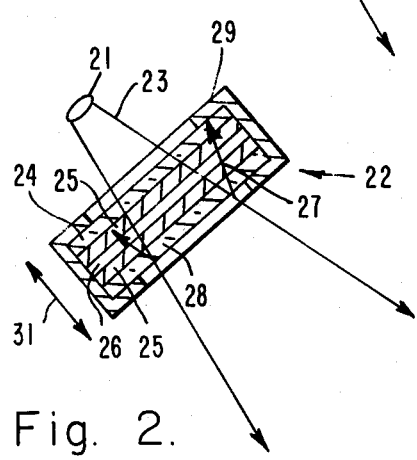
FIG. 2 illustrates a method of producing an intensity mask for use in generating coherent optical signals such as those used to produce holographic exposures which reduces noise due to both graininess and surface reflection.

Referring to FIG. 2, there is shown a system which employs the method of the present invention to produce another intensity mask 26 for use in generating a coherent optical signal, such as may be used in a holographic exposure. The system includes the coherent radiation source 21, such as the laser source, or the like, which projects the coherent beam 23 through apparatus 22 utilized to produce the mask 26. In this particular embodiment, the apparatus 22 comprises an enclosure 29 which houses a pair of glass plates 24, 28, between which is disposed the mask 26, such as a photographic film, or the like. An index matching fluid 25, such as mineral oil, or or the like, is disposed between the plates 24, 28 and the mask 26.

Diffraction patterns are created when the beam 23 is multiply reflected (shown generally by reflections 27) between the glass plates 24, 28 and onto the mask 26. It is advantageous for those multiple reflections entering the mask to be eliminated or reduced. The multiple reflection generally causes unwanted diffraction patterns in the mask 26. However, by modulating the positions of the glass plate 24, 28 during exposure of the mask 26, the recorded noise pattern created by the multiple reflections is substantially eliminated. The motion of the glass plates 24, 28 are such that they may be moved on the order of several wavelengths of the exposing radiation in any direction. This technique is generally described in copending U.S. patent applications entitled "Systems for forming improved reflection holograms with a single beam", Ser. No. 269,104, filed June 1, 1981, "Systems for forming improved diffusion holograms", Ser. No. 269,105, filed June 1, 1981, and "Systems for forming improved holograms", Ser. No. 269,106, filed June 1, 1981.

In order to additionally reduce the noise recorded on the mask 26, the method of the present invention provides for modulating the position of the apparatus 22 as indicated by arrow 31. This position modulation, in combination with the motion of the glass plates 24, 28, reduces both speckle noise and noise due to reflections. The motion of the apparatus 22 during modulation may also be on the order of several wavelengths of the radiation provided by the coherent source 21.

The intensity mask 26 shown in FIGS. 1 and 2 may be produced by means of a photosensitive negative system, or the like. If such a system is employed, it is desirous to only record intensity information. Therefore, special precautions must be taken to prevent recording amplitude or phase information representing interference caused by the recording medium itself. To accomplish this, a variety of measures are possible as alternatives to the use of the modulated glass plates disclosed above. Other methods include use of a liquid gate during the exposure process, use of anti-halation-backed glass, or the use of anti-reflection coated glass. However, these methods are not as effective as the method described herein.

Figure 3:
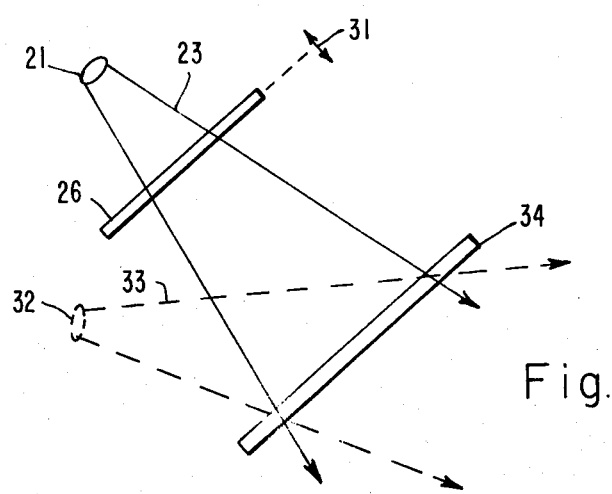
FIG. 3 illustrates a system for generating a holographic exposure which employs the method of the present invention.

Referring to FIG. 3 there is shown a system which employs a mask 26 generated as described above to produce a holographic exposure. The system comprises the radiation source 21 which projects the coherent beam 23 through the intensity mask 26, and onto a holographic recording medium 34. In addition a second coherent radiation source 32 is provided which projects a second beam 33 onto the recording medium 34. The second beam 33 may be generated by utilizing the coherent source 21 and a beamsplitter, or the like, to ensure that both beams 23, 33 are coherent. The diffraction pattern created by the interference of both beams 23, 33, produces the desired diffraction pattern in the recording medium 34. The use of the method of the present invention provides that the intensity mask 26 be modulated in position on the order of wavelengths of the incident radiation during the holographic exposure process, shown by arrow 31. The preferred direction of modulation is along an axis between the coherent radiation source 21 and the holographic recording medium 34. For example, a typical amount of motion would be on the order of 0.25 to 20 micrometers for a typical helium neon (632.8 nanometer) laser source.

The intensity mask 26 is moved during the holographic exposure process as is indicated by arrow 31. This movement creates fringe instability of the noise inherent in the mask 26. Therefore, the hologram of the noise is not recorded while the desired diffraction pattern is. The motion produces movement of the interference fringes caused by grain or surface reflection, and hence, in the case of an amplitude hologram, creates an overall fogging of the recording medium. The primary wavefronts of the recording radiation are not disturbed when the motion is limited to the distances indicated above and when the intensity mask 26 has no optical power, such as would be provided by a lens.

As described above, the intensity mask 26 is an apodizer, and it is only one of many apodizer types. For example, an alternate mask material may be employed which allows for the recording of a phase hologram at the position of the mask 26 (FIG. 1 or 2) rather than the use of a photosensitive negative material as described hereinabove. Typical of such phase hologram materials are dichromated gelatin, or the like, which form a conventional reflection hologram. The formation of a phase hologram for use as the intensity mask 26 may be generated by employing a mirror in the position of the glass plate 28 of FIG. 2 during the exposure process. This plate would not be moved during the formation and would be replaced by the plate 28 when employed. One advantage of dichromated gelatin holograms is that they are substantially grainless and hence low in noise. Also, the use of the phase hologram mask allows for the use of a higher power laser in the system since this type of mask does not appreciably absorb light. Additional materials for use in producing the holographic mask are bleached photographic film, or a photopolymer which is sensitive to the radiation utilized to produce the final holographic exposure.

The system of FIG. 3 may also employ the use of a sharp-edged aperture instead of the intensity mask 26, or apodizer, as described hereinabove. An aperture is also considered to be an apodizer for the purposes of the present invention. The unwanted diffraction patterns are created when the beam 23 diffracts from the edge of the aperture. Using the method of the present invention, the aperture is modulated in position as shown by arrow 31 in FIG. 3 during the holographic exposure process. The motion of the aperture is such that it is moved on the order of ½ to 50 wavelengths of the incident radiation.

Figure 4:
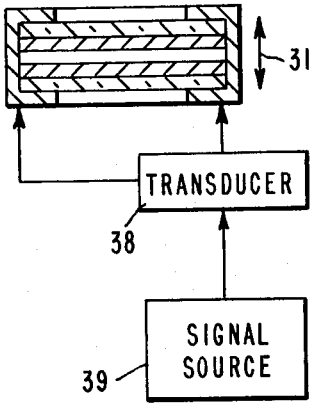
FIG. 4 illustrates one method for modulating the position of apodizers utilized with the present invention.

It is preferred that the total amount of movement be an integral number of ½ wavelengths. This may be accomplished by a drive system, such as a piezoelectric crystal, or the like, driven by a triangular waveshape. FIG. 4 shows an arrangement for use in modulating the aperture or apodizer during either the apodizer formation process or the holographic exposure process. As mentioned above, a transducer 38, such as a piezoelectric crystal, is attached to the aperture or apodizer, shown as apparatus 22. A signal source 39, which may produce a triangular drive signal, is coupled to the transducer 38 in order to cause movement of the apparatus 22.

It is to be understood, however, that other types of motion may be employed to move the aperture or apodizer. As mentioned above, a non-circular aperture may be rotated about the optical axis. A circular aperture may be moved radially, such as is provided by an iris diaphragm. An apodizer may also be moved transversely to the direction of illuminating radiation.

Thus, there has been disclosed a method for use in producing apodizers, such as intensity masks, and a method of producing holographic exposures employing apertures or apodizers which reduces the noise content of the recorded holographic exposure.

It is to be understood that the above-described embodiments are merely illustrative of some of the many possible specific embodiments which represent applications of the principles of the present invention. Clearly, numerous and varied other arrangements may be readily devised by those skilled in the art without departing from the spirit and scope of the invention. For example, the method of the present invention is applicable to system which generate acoustic holograms.

What is claimed is:

1. A method of reducing the coherent noise content introduced in coherent radiation systems having a coherent radiation source, said method comprising the steps of:
   disposing an apodizer along an optical path associated with a coherent radiation system; and
   modulating the position of said apodizer with respect to said coherent radiation source during operation of said system.

2. The method of claim 1 wherein said modulating step comprises:
   modulating the position of said apodizer axially along said optical path a predetermined number of wavelengths of the radiation provided by said coherent radiation source.

3. The method of claim 1 wherein said modulating step comprises:
   modulating the position of said apodizer radially about said optical path a predetermined number of wavelengths of the radiation provided by said coherent radiation source.

4. A method of producing holographic exposures having reduced coherent noise content, said method comprising the steps of:
   producing an apodizer which is placed in an optical path of a coherent radiation source used to generate a holographic exposure; and
   modulating the position of said apodizer with respect to said coherent radiation source during the holographic exposure process.

5. The method of claim 1 wherein the step of producing said apodizer further comprises:
   modulating the position of said apodizer with respect to said coherent radiation source during the formation thereof.

* * * * *